(12) United States Patent
Naik

(10) Patent No.: US 7,215,503 B2
(45) Date of Patent: May 8, 2007

(54) TIME LINEAR ARRIVAL FOR VELOCITY MODE SEEKS

(75) Inventor: Apurva Dolatrai Naik, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 371 days.

(21) Appl. No.: 10/600,955

(22) Filed: Jun. 20, 2003

(65) Prior Publication Data

US 2004/0257696 A1    Dec. 23, 2004

(51) Int. Cl.
*G11B 5/596*    (2006.01)

(52) U.S. Cl. ................. 360/78.06; 360/78.07

(58) Field of Classification Search ............ None
See application file for complete search history.

(56) References Cited

U.S. PATENT DOCUMENTS

| | | | |
|---|---|---|---|
| 4,679,103 A | 7/1987 | Workman | |
| 4,937,689 A * | 6/1990 | Seaver et al. ............ | 360/78.07 |
| 5,016,126 A | 5/1991 | Horie et al. | |
| 5,119,250 A | 6/1992 | Green et al. | |
| 5,128,813 A | 7/1992 | Lee | |
| 5,164,931 A | 11/1992 | Yamaguchi et al. | |
| 5,206,570 A | 4/1993 | Hargarten et al. | |
| 5,291,110 A * | 3/1994 | Andrews et al. ............ | 318/560 |
| 5,825,582 A * | 10/1998 | Supino et al. ........... | 360/78.06 |
| 5,912,782 A | 6/1999 | Lee et al. | |
| 6,013,995 A | 1/2000 | Kim | |
| 6,046,878 A | 4/2000 | Liu et al. | |
| 6,195,222 B1 | 2/2001 | Heminger et al. | |
| 6,347,018 B1 | 2/2002 | Kadlec et al. | |
| 6,469,863 B1 | 10/2002 | Ell | |
| 6,490,120 B1 | 12/2002 | Burton et al. | |
| 6,594,105 B1 * | 7/2003 | Brittner ................... | 360/78.06 |
| 6,606,217 B1 * | 8/2003 | Wakuda et al. .......... | 360/78.04 |
| 6,850,386 B2 * | 2/2005 | Kovinskaya et al. ..... | 360/78.06 |
| 2002/0006010 A1* | 1/2002 | Ding et al. .............. | 360/78.06 |
| 2002/0114098 A1* | 8/2002 | Magee et al. ............ | 360/77.02 |

* cited by examiner

*Primary Examiner*—Andrew L. Sniezek
(74) *Attorney, Agent, or Firm*—Fellers, Snider, et al.

(57) ABSTRACT

A method, computer program product, and apparatus for controlling the arrival of a disc drive actuator arm assembly using a time-linear arrival profile are disclosed. A reference velocity is calculated as a function of the current position of the arm assembly and the amount of time left to complete the seek operation, where the first derivative of the reference velocity function with respect to time varies linearly with respect to time. This reference velocity is used to control the actual velocity of an arm assembly. In a preferred embodiment, this time-linear arrival is utilized in the second stage of a two-stage arrival sequence, in which the arm assembly follows a constant-acceleration profile during the first stage.

11 Claims, 3 Drawing Sheets

TIME LINEAR ARRIVAL FOR VELOCITY MODE SEEKS

FIELD OF THE INVENTION

Embodiments of the present invention relate generally to control systems for disc drives. More particularly, the present embodiments relate to improving seek performance in a disc drive by way of a control system employing an improved reference profile for controlling arrival at a track.

BACKGROUND OF THE INVENTION

Disc drives are commonly used in workstations, personal computers, laptops and other computer systems to store large amounts of data in a form that can be made readily available to a user. In general, a disc drive comprises a magnetic disc that is rotated by a spindle motor. The surface of the disc is divided into a series of data tracks. The data tracks are spaced radially from one another across a band having an inner diameter and an outer diameter.

Each of the data tracks extends generally circumferentially around the disc and can store data in the form of magnetic transitions within the radial extent of the track on the disc surface. An interactive element, such as a magnetic transducer, is used to sense the magnetic transitions to read data, or to transmit an electric signal that causes a magnetic transition on the disc surface, to write data. The magnetic transducer includes a read/write gap that contains the active elements of the transducer at a position suitable for interaction with the magnetic surface of the disc. The radial dimension of the gap fits within the radial extent of the data track containing the transitions so that only transitions of the single track are transduced by the interactive element when the interactive element is properly centered over the respective data track.

The magnetic transducer is mounted by a head structure to a rotary actuator arm and is selectively positioned by the actuator arm over a preselected data track of the disc to either read data from or write data to the preselected data track of the disc, as the disc rotates below the transducer. The actuator arm is, in turn, mounted to a voice coil motor that can be controlled to move the actuator arm across the disc surface.

A servo system is typically used to control the position of the actuator arm to insure that the head is properly centered over the magnetic transitions during either a read or write operation. In a known servo system, servo position information is recorded on the disc surface between written data blocks, and periodically read by the head for use in a closed loop control of the voice coil motor to position the actuator arm. Such a servo arrangement is referred to as an embedded servo system.

In modern disc drive architectures utilizing an embedded servo, each data track is divided into a number of data sectors for storing fixed sized data blocks, one per sector. Associated with the data sectors are a series of servo sectors, generally equally spaced around the circumference of the data track. The servo sectors can be arranged between data sectors or arranged independently of the data sectors such that the servo sectors split data fields of the data sectors.

Each servo sector contains magnetic transitions that are arranged relative to a track centerline such that signals derived from the transitions can be used to determine head position. For example, the servo information can comprise two separate bursts of magnetic transitions, one recorded on one side of the track centerline and the other recorded on the opposite side of the track centerline. Whenever a head is over a servo sector, the head reads each of the servo bursts and the signals resulting from the transduction of the bursts are transmitted to, e.g., a microprocessor within the disc drive for processing.

When the head is properly positioned over a track centerline, the head will straddle the two bursts, and the strength of the combined signals transduced from the burst on one side of the track centerline will equal the strength of the combined signals transduced from the burst on the other side of the track centerline. The microprocessor can be used to subtract one burst value from the other each time a servo sector is read by the head. When the result is zero, the microprocessor will know that the two signals are equal, indicating that the head is properly positioned.

If the result is other than zero, then one signal is stronger than the other, indicating that the head is displaced from the track centerline and overlying one of the bursts more than the other. The magnitude and sign of the subtraction result can be used by the microprocessor to determine the direction and distance the head is displaced from the track centerline, and generate a control signal to move the actuator back towards the centerline.

Each servo sector also contains encoded information to uniquely identify the specific track location of the head. For example, each track can be assigned a unique number, which is encoded using a Gray code and recorded in each servo sector of the track. The Gray code information is used in conjunction with the servo bursts to control movement of the actuator arm when the arm is moving the head in a seek operation from a current track to a destination track containing a data field to be read or written.

A seek operation generally consists of three phases, an acceleration phase in which the actuator arm begins to move and picks up speed, a coasting phase during which acceleration stays constant (if required), and a deceleration phase in which the actuator arm (and head) slows down to arrive at the desired track. The final approach of the head to the desired track is known as "arrival."

The arrival portion of a seek operation can have a profound impact on the performance of a disc drive, since seeking is one of the most expensive operations performed by a disc drive in terms of performance cost. Because acceleration and velocity are continuous physical quantities, it is not possible for the actuator arm to come to an instantaneous stop from any arbitrary velocity. Instead, the actuator arm must gradually decelerate at a controlled rate in order for the head to become centered over the desired track. If deceleration is too rapid, the actuator arm control system may experience overshoot and instabilities (such as oscillation) that make track following difficult and ultimately result in performance degradation. If, on the other hand, deceleration is too gradual, performance will also be degraded because the seek operation itself will take too long.

The present embodiments provide a solution to this and other problems, and offers other advantages over previous solutions.

SUMMARY OF THE INVENTION

Embodiments of the present invention provide a method and apparatus for controlling the arrival of a disc drive actuator arm assembly using a time-linear arrival profile. Some embodiments of the present invention employ a closed-loop control system in which velocity is the controlled parameter. A reference velocity is calculated as a function of the current position of the arm assembly and the amount of time left to complete the seek operation, where the first derivative of the reference velocity function with respect to time varies linearly with respect to time. This computed reference velocity is compared to the actual velocity as determined from measuring the position of the arm assembly and the actual command signal applied to the arm assembly motor. An error signal is thus obtained. This error signal is summed with a feedforward signal to achieve the desired command signal, where the feedforward signal is derived from the measured acceleration of the arm assembly. In some embodiments, this time-linear arrival is utilized in the second stage of a two-stage arrival sequence, in which the arm assembly follows a constant-acceleration profile during the first stage.

These and various other features as well as advantages which characterize the present embodiments will be apparent upon reading of the following detailed description and review of the associated drawings.

DETAILED DESCRIPTION

Figure 1:
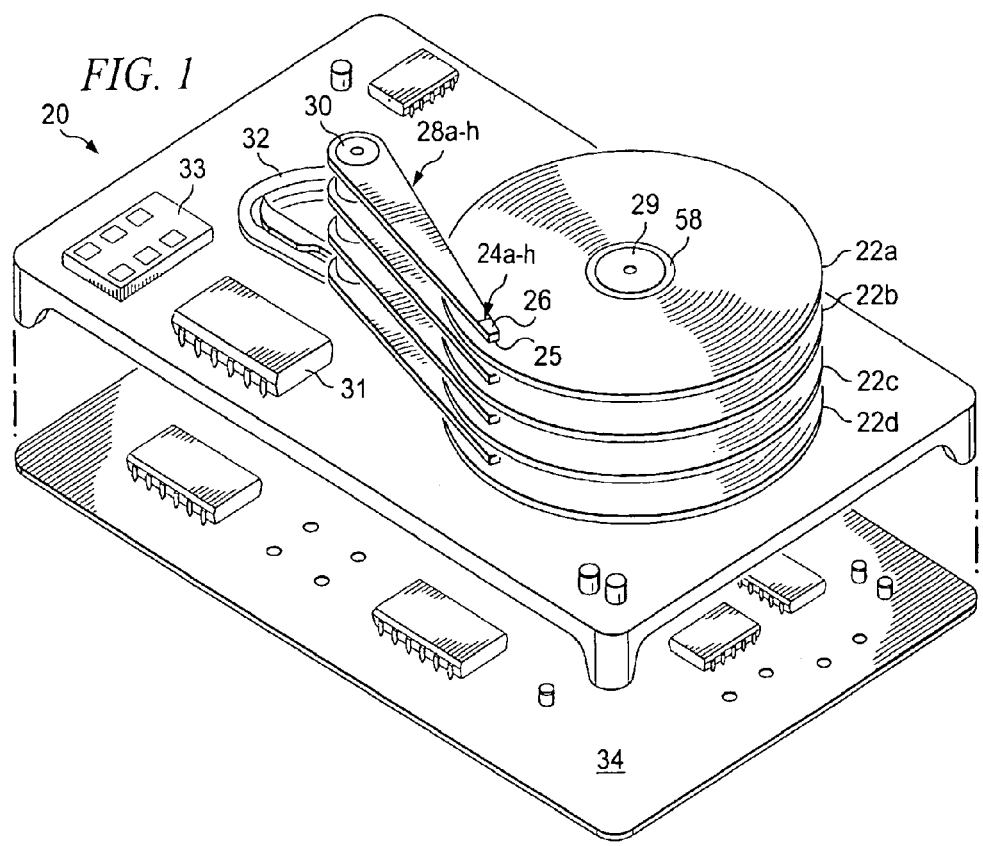
FIG. 1 is an exemplary perspective view of an exemplary disc drive.

Referring now to the drawings, and initially to FIG. 1, there is illustrated an example of a disc drive designated generally by the reference numeral 20. The disc drive 20 includes a stack of storage discs 22a–d and a stack of read/write heads 24a–h. In the depicted example, heads are only shown on the top surface of each platter of the disc driver for simplicity and clarity of the drawing, however, it should be noted that additional heads are typically provided for the bottom surfaces of each platter as well. Each of the storage discs 22a–d is provided with a plurality of data tracks to store user data. As illustrated in FIG. 1, one head is provided for each surface of each of the discs 22a–d such that data can be read from or written to the data tracks of all of the storage discs. The heads are coupled to a pre-amplifier 31. It should be understood that the disc drive 20 is merely representative of a disc drive system utilizing the present invention and that the present embodiments can be implemented in a disc drive system including more or fewer storage discs.

The storage discs 22a–d are mounted for rotation by a spindle motor arrangement 29, as is known in the art. Moreover, the read/write heads 24a–h are supported by respective actuator arms 28a–h for controlled positioning over preselected radii of the storage discs 22a–d to enable the reading and writing of data from and to the data tracks. To that end, the actuator arms 28a–h are rotatably mounted on a pin 30 by a voice coil motor 32 operable to controllably rotate the actuator arms 28a–h radially across the disc surfaces. One of ordinary skill in the art will recognize that some disc drives utilize linear voice coil actuator arms that move laterally along a radial direction with respect to the discs, rather than the rotary voice coil actuator arms depicted here.

Each of the read/write heads 24a–h is mounted to a respective actuator arm 28a–h by a flexure element (not shown) and comprises a magnetic transducer 25 mounted to a slider 26 having an air bearing surface (not shown), all in a known manner. As typically utilized in disc drive systems, the sliders 26 cause the magnetic transducers 25 of the read/write heads 24a–h to "fly" above the surfaces of the respective storage discs 22a–d for non-contact operation of the disc drive system, as discussed above. When not in use, the voice coil motor 32 rotates the actuator arms 28a–h during a contact stop operation, to position the read/write heads 24a–h over a respective landing zone 58 or 60, where the read/write heads 24a–h come to rest on the storage disc surfaces. As should be understood, each of the read/write heads 24a–h is at rest on a respective landing zone 58 or 60 at the commencement of a contact start operation.

A printed circuit board (PCB) 34 is provided to mount control electronics for controlled operation of the spindle motor 29 and the voice coil motor 32. The PCB 34 also includes read/write channel circuitry coupled to the read/write heads 24a–h via the pre-amplifier 31, to control the transfer of data to and from the data tracks of the storage discs 22a–d. The manner for coupling the PCB 34 to the various components of the disc drive is well known in the art, and includes a connector 33 to couple the read/write channel circuitry to the pre-amplifier 31.

Figure 2:
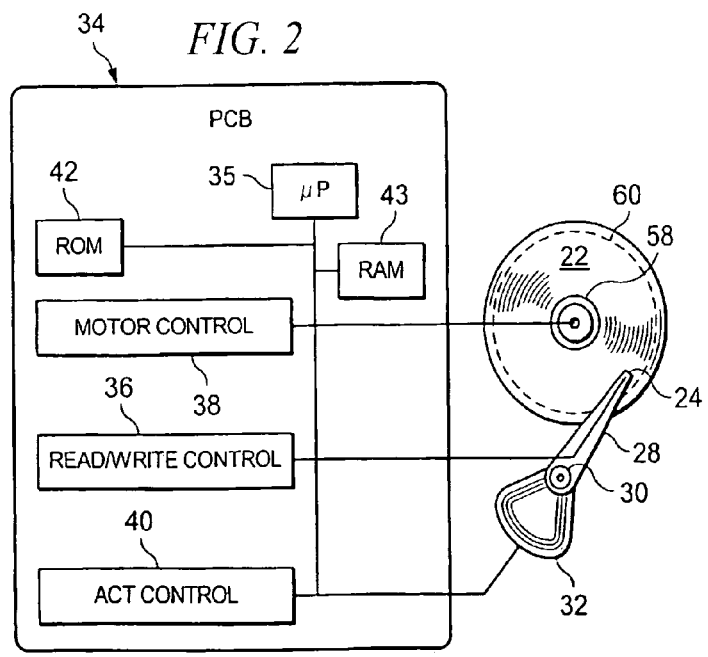
FIG. 2 is an exemplary top plan view of the printed circuit board of the exemplary disc drive of FIG. 1.

Referring now to FIG. 2, there is illustrated in schematic form the PCB 34 and the electrical couplings between the control electronics on the PCB 34 and the components of the disc drive system described above. A microprocessor 35 is coupled to each of a read/write control 36, spindle motor control 38, actuator control 40, ROM 42 and RAM 43. In modern disc drive designs, the microprocessor can comprise a digital signal processor (DSP). The microprocessor 35 sends data to and receives data from the storage discs 22a–d via the read/write control 36 and the read/write heads 24a–h.

The microprocessor 35 also operates according to instructions stored in the ROM 42 to generate and transmit control signals to each of the spindle motor control 38 and the actuator control 40. The spindle motor control 38 is responsive to the control signals received from the microprocessor 35 to generate and transmit a drive voltage to the spindle motor 29 to cause the storage discs 22a–d to rotate at an appropriate rotational velocity.

Similarly, the actuator control 40 is responsive to the control signals received from the microprocessor 35 to generate and transmit a voltage to the voice coil motor 32 to controllably rotate the read/write heads 24a–h, via the actuator arms 28a–h, to preselected radial positions over the storage discs 22a–d. The magnitude and polarity of the voltage generated by the actuator control 40, as a function of the microprocessor control signals, determines the radial direction and radial speed of the read/write heads 24a–h.

When data to be written or read from one of the storage discs 22a–d are stored on a data track different from the current radial position of the read/write heads 24a–h, the microprocessor 35 determines the current radial position of the read/write heads 24a–h and the radial position of the data track where the read/write heads 24a–h are to be relocated. The microprocessor 35 then implements a seek operation wherein the control signals generated by the microprocessor 35 for the actuator control 40 cause the voice coil motor 32 to move the read/write heads 24a–h from the current data track to a destination data track at the desired radial position.

When the actuator has moved the read/write heads 24a–h to the destination data track, a multiplexer (not shown) is used to couple the head 24a–h over the specific data track to be written or read, to the read/write control 36, as is generally known in the art. The read/write control 36 includes a read channel that, in accordance with modern disc drive design, comprises an electronic circuit that detects information represented by magnetic transitions recorded on the disc surface within the radial extent of the selected data track. As described above, each data track is divided into a number of data sectors.

During a read operation, electrical signals transduced by the head from the magnetic transitions of the data sectors are input to the read channel of the read/write control 36 for processing via the pre-amplifier 31. The RAM 43 can be used to buffer data read from or to be written to the data sectors of the storage discs 22a–d via the read/write control 36. The buffered data can be transferred to or from a host computer utilizing the disc drive for data storage.

The present embodiments provide a method and apparatus for controlling the arrival of a disc drive actuator arm assembly using a time-linear arrival profile. Some embodiments of the present invention employ a closed-loop control system in which velocity is the controlled parameter. A reference velocity is calculated as a function of the current position of the arm assembly and the amount of time left to complete the seek operation, where the first derivative of the reference velocity function with respect to time varies linearly with respect to time. This computed reference velocity is compared to the actual velocity as determined from measuring the position of the arm assembly and the actual command signal applied to the arm assembly motor. An error signal is thus obtained. This error signal is summed with a feedforward signal to achieve the desired command signal, where the feedforward signal is derived from the measured acceleration of the arm assembly.

In some embodiments, the arrival phase of a seek operation is conducted in two stages. In the first stage, the acceleration (which is actually deceleration in the case of arrival) is a constant and represents an optimum level of acceleration for the voice coil motor. This allows the arm assembly to move at an optimal velocity for as long as practicable. This first stage is said to follow a "square root" velocity profile, because the velocity of the head when acceleration is constant is $\sqrt{2ax}$, where a is the instantaneous acceleration of the head and x is the position of the head as measured from the desired track. In a preferred embodiment, the "desired track" that is used to compute the square root velocity profile may not be the actual track to which the entire seek will take place; an optimal target track for the square root velocity profile is chosen at the beginning in order to optimize the overall seek time.

Figure 5A:
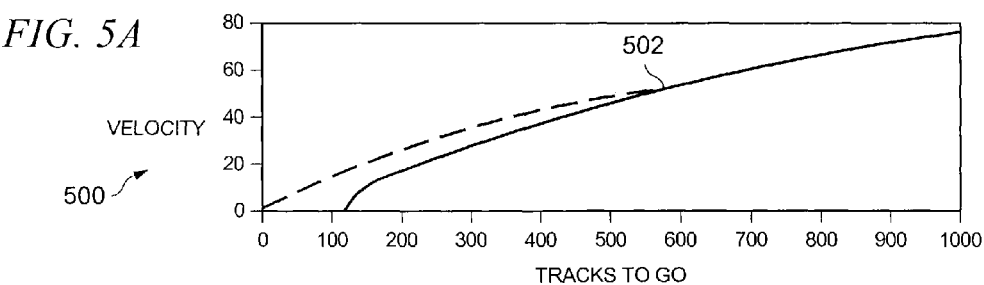
FIG. 5 is a phase plane diagram depicting the operation of a track arrival using square root and time-linear arrival profiles in accordance with embodiments of the present invention.
Figure 5B:
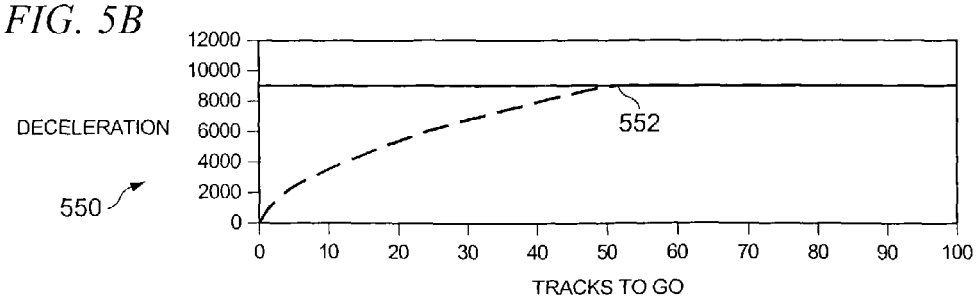

The second stage is the "time-linear arrival" stage, in which the acceleration of the head varies linearly with respect to time until the acceleration, velocity, and position of the head converge at zero at the desired track. In a preferred embodiment, the point at which the transition from the "square-root" velocity profile stage to the "time-linear arrival" stage takes place is determined before the seek operation takes place, by determining a point at which a smooth transition may be made from the square root profile to the time-linear arrival profile. One of ordinary skill in the art will recognize that such a transition point may be determined by setting one or more of the motion functions (e.g., velocity or acceleration) of one profile equal to the corresponding function(s) from the other profile and solving for the unknown distance at which the acceleration and/or velocity value(s) from both profiles are equal. An example of this transition process is provided in FIG. 5. FIG. 5 is a phase plane diagram of a two-stage arrival in accordance with embodiments a of the present invention. Graph 500 shows a transition point 502 between a square root velocity profile (solid line) and a time-linear arrival profile (dashed line) in terms of head velocity and the number of tracks to go in the seek operation. Similarly graph 550 depicts a transition point 552 between a square root velocity profile (solid line) and a time-linear arrival profile (dashed line) in terms of head deceleration and the number of tracks to go in the seek operation.

In the "time-linear arrival" stage, the position of the head varies polynomially with respect to time, rather than exponentially. A set of basic motion functions for a time-linear arrival are as follows:

$$a(t) = a_0 mt,$$
$$v(t) = \frac{1}{2}a_0 mt^2,$$
$$x(t) = \frac{1}{6}a_0 mt^3,$$

where m, the "slope constant," determines the slope of the acceleration function a(t). If the total time to decelerate from $a_0$ to 0 is given as T, then $m=T^{-1}$. Thus, by "time linear" it is meant that acceleration varies linearly with respect to time. Since instantaneous acceleration is the first derivative (from the differential calculus) of instantaneous velocity, it is a necessary and sufficient condition of a time-linear arrival profile that the first derivative of the velocity varies linearly with respect to time. It can be easily verified that the above motion functions for time-linear arrival may be rewritten as follows:

$$a(t) = \frac{2v}{t},$$
$$v(t) = \frac{3x}{t},$$
$$x(t) = \frac{a_0}{6m^2}.$$

It can also be easily verified that the following equations also define a time-linear arrival profile:

$$a(SamsToGo) = \frac{2v}{SamsToGo},$$
$$v(SamsToGo) = \frac{3x}{SamsToGo},$$
$$x(SamsToGo) = \frac{1}{6}a_0 \cdot SamsToGo^2,$$

where SamsToGo represents the number of sampling periods left in the duration of the seek operation. In some embodiments, these sampling periods correspond to the time periods between successive samples of servo information from the disc to determine the position of the head with respect to the disc's tracks. These motion functions in terms of SamsToGo are easily calculated in fixed-point arithmetic in digital circuitry or in a stored-program computer. In a preferred embodiment, SamsToGo itself is predetermined according to empirical data gathered during the design process of the disc drive, as this number will be specific to a particular mechanical and electrical design. Embodiments of the present invention determine a reference velocity $v_{ref}(t)$ using the above function definition for v(t) by applying an empirically estimated position value for x and the estimated number samples remaining as SamsToGo. $v_{ref}(t)$ is then compared with an empirically estimated velocity figure to derive an error signal, which is then used to correct the command signal fed to the voice coil motor.

Figure 3:
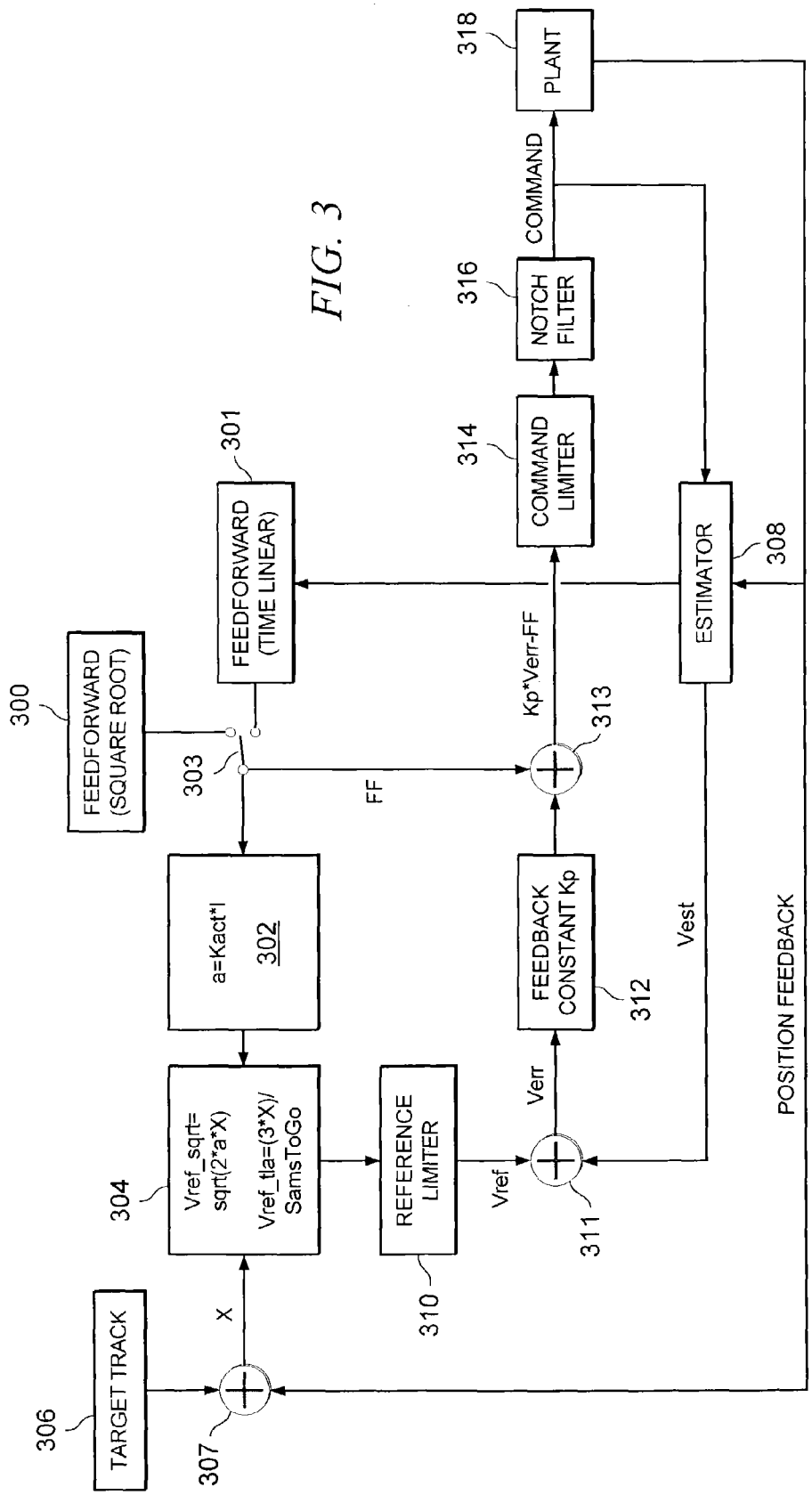
FIG. 3 is a block diagram of a disc drive actuator arm control system in accordance with embodiments of the present invention.

FIG. 3 is a block diagram of a disc drive actuator arm control system in accordance with embodiments of the present invention. The block diagram represented in FIG. 3 is representative of control circuitry or program code for computer-based control. Although this discussion will refer to the elements described in FIG. 3 in terms of components of a control circuit (e.g., multiplier 302, etc.), it should be understood by those skilled in the art that the control system described in FIG. 3 may be implemented in program code for execution in a stored-program computing device (e.g., a microprocessor, microcontroller, DSP, or other device that executes software), in dedicated circuitry, or in a combination of both. Each block in FIG. 3 may be implemented as one or more instructions in a programming language such as C, for example.

In some embodiments, while the square root profile is being used, a feedforward signal 300 is generated based on the maximum current drive for plant 318, which, in some embodiments, is a voice coil motor. Feedforward signal 300 represents a desired acceleration profile. In the "square-root" velocity profile mode of operation, feedforward signal 300 is a constant that represents the maximum command current that can be fed to plant 318. In the "time-linear arrival" velocity profile mode, on the other hand, acceleration varies linearly with respect to time. Thus, during the time-linear arrival portion of a seek operation, feedforward signal 301, which is derived from an empirically estimated acceleration, is used instead (which is itself computed from the velocity of the head as determined by estimator 308—where the acceleration is calculated from velocity as 2v/SamsToGo and the velocity is calculated as 3x/SamsToGo). In FIG. 3, a switch 303 represents the ability to switch from the square root velocity profile to the time-linear arrival profile. The closed-loop system of FIG. 3 uses velocity as the controlled parameter to correct feedforward signal 300 (in the square root profile) or feedforward signal 301 (in the time-linear arrival profile) in order to be used as a command signal to plant 318.

Multiplier 302 converts feedforward signal 300 from a value of an electrical current (i.e., to drive plant 318) to an acceleration value. Meanwhile, the desired track (target track 306) is compared with position feedback information from plant 318 to generate a position value X (summing block 307). Reference velocity generator 304 takes this current position information and current acceleration information and uses this information, along with the number of remaining sampling periods (SamsToGo) and derives a reference velocity. This reference velocity is derived according to a different formula, depending on whether the "square root" profile is being used or the "time-linear arrival" profile is being used, as shown in FIG. 3. In the square-root profile, the reference velocity is computed as sqrt(2*a*X) (which denotes $\sqrt{2ax}$ in several programming languages). In the "time-linear arrival" profile, the reference velocity is computed as (3*X)/SamsToGo. A limiter 310 is applied to the output of reference velocity generator 304 to keep the output within acceptable ranges.

Estimator 308 takes position feedback information from plant 318 and the command signal that is fed to plant 318 (which is indicative of acceleration), and computes an empirical estimate of the velocity of the head. This estimated velocity is compared with the reference velocity (summing block 311) to obtain an error signal. This error signal is then multiplied by a suitable constant (multiplier 312) to obtain a scaled error signal. The scaled error signal is then compared with feedforward signal 300 (summing block 313) to obtain an adjusted command signal. A limiter 314 and notch filter 316 are applied to this adjusted command signal to keep the command signal within acceptable current levels and to prevent instability, respectively. This limited, filtered command signal is then fed into plant 318 to control movement of the actuator arm assembly.

Figure 4:
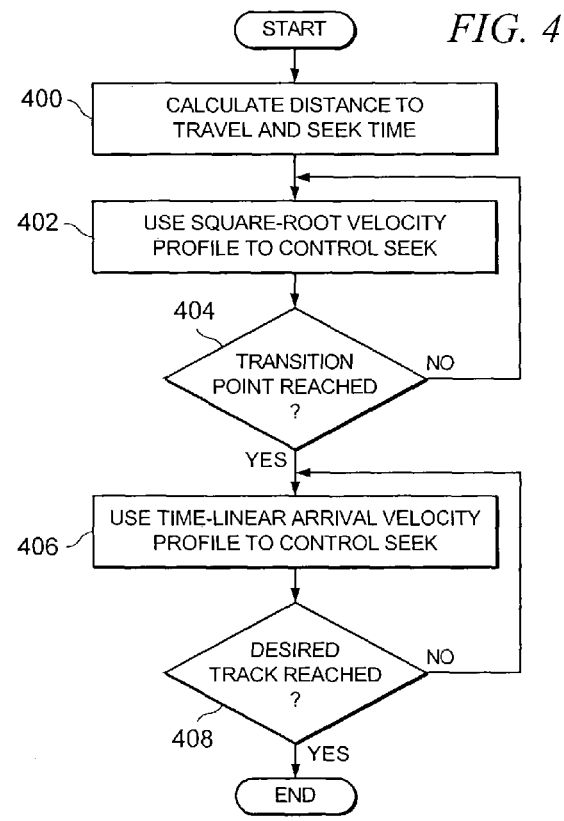
FIG. 4 is a flowchart representation of a process of performing a seek in accordance with embodiments of the present invention.

FIG. 4 is a flowchart representation of a process of controlling the arrival phase of a seek operation in a disc drive in accordance with preferred embodiments of the present invention. The distance to travel and time to complete the arrival phase of the seek are first calculated (block 400). The square root velocity profile is initially used in a control system as in FIG. 3 to control the deceleration of the actuator arm assembly (block 402), and the square root velocity profile continues to be used (block 404: No) until a pre-determined transition point is reached. When the transition point is reached (block 404: Yes), then the time-linear velocity profile is used instead of the square root profile (block 406) until the desired track is reached (block 408), after which time track following and track access may be enabled.

Thus, a novel method and apparatus for controlling the arrival of a disc drive arm assembly at a track, are herein disclosed and characterized by steps of determining a current velocity of the arm assembly; determining a current position of the arm assembly; determining a current acceleration of the arm assembly; determining a reference velocity based on at least the current position of the arm assembly; comparing the current velocity of the arm assembly with the reference velocity to generate an error signal; combining the error signal with a feedforward signal to generate a command signal, wherein the feedforward signal is derived from the current acceleration; and applying the command signal to move the arm assembly, wherein the reference velocity is determined in accordance with a function that causes a first derivative with respect to time of the reference velocity to vary linearly with respect to time.

It is important to note that while the present embodiments have been described in the context of a fully functioning data processing system, those of ordinary skill in the art will appreciate that the processes of the present embodiments are capable of being distributed in the form of a computer readable medium of instructions or other functional descriptive material and in a variety of other forms and that the present embodiments are equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

The description of the present embodiments has been presented for purposes of illustration and description, and is not intended to be exhaustive or limited to the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

What is claimed is:

1. A method comprising generating a reference velocity to control a moveable arm, wherein the reference velocity is based on a function expressed in terms of a distance to be traveled and a remaining seek time that causes a first derivative with respect to time of the reference velocity to vary linearly with respect to time.

2. The method of claim 1, wherein the function is a first function, wherein the reference velocity is initially determined in accordance with a second function, and wherein the reference velocity is determined in accordance with the first function in response to the moveable arm reaching a position that is within a pre-designated distance from a target position.

3. An apparatus comprising:
a moveable assembly; and
circuitry having an output lead and coupled to control the moveable assembly, wherein the circuitry is adapted to generate a command signal responsive to a reference velocity and provide the command signal on the output lead, wherein the reference velocity is determined in accordance with a function expressed in terms of a distance to be traveled and a remaining seek time that causes a first derivative with respect to time of the reference velocity to vary linearly with respect to time.

4. The apparatus of claim 3, wherein the function is a first function, wherein the reference velocity is initially determined in accordance with a second function that is distinct from the first function, and wherein the reference velocity becomes determined in accordance with the first function in response to the moveable assembly reaching a position that is within a pre-designated distance from a desired position.

5. The apparatus of claim 3 further including a motor that is controlled by the circuitry and is adapted to move the moveable assembly.

6. The apparatus of claim 5 further including a storage medium where the moveable assembly is moved relative to the storage medium.

7. The apparatus of claim 3, wherein the circuitry includes a stored-program computing device.

8. The apparatus of claim 3, wherein the moveable assembly includes a transducer that is configured to rotate about an axis and moves the transducer with respect to a plurality of tracks by rotating about the axis.

9. The apparatus of claim 3, wherein the moveable assembly is configured to reposition the transducer with respect to the plurality of tracks by moving linearly in a radial direction with respect to the storage medium.

10. A method comprising:
determining a reference velocity based on at least a current position of a moveable arm;
comparing a current velocity of the moveable arm with the reference velocity to generate an error signal;
combining the error signal with a compensation signal to generate a command signal, wherein the compensation signal is derived from a current acceleration; and
applying the command signal to move the moveable arm, wherein the reference velocity is determined in accordance with a function that causes a first derivative with respect to time of the reference velocity to vary linearly with respect to time.

11. The method of claim 10 further comprising the steps of:
determining the current velocity of the moveable arm;
determining a current position of the moveable arm; and
determining the current acceleration of the moveable arm.

* * * * *